United States Patent [19]

Haden, Jr. et al.

[11] Patent Number: 4,470,864

[45] Date of Patent: Sep. 11, 1984

[54] PNEUMATIC LABELLING APPARATUS

[75] Inventors: Richard E. Haden, Jr., Nashville, Tenn.; Darrell R. Johnson, Madison, Tenn.

[73] Assignee: Tennessee Imports, Nashville, Tenn.

[21] Appl. No.: 528,872

[22] Filed: Sep. 1, 1983

[51] Int. Cl.$^{3}$ .......................... B44C 7/04; B32B 31/00; B41F 1/08

[52] U.S. Cl. .................................... 156/384; 156/541; 156/577; 156/579; 101/288

[58] Field of Search ............... 156/387, 384, 541, 540, 156/579, 584, 361, 475, DIG. 33, DIG. 49, DIG. 48, 577; 101/288, 297, 306; 226/150

[56] References Cited

U.S. PATENT DOCUMENTS

| | | | |
|---|---|---|---|
| 4,114,791 | 9/1978 | Schneider | 226/150 |
| 4,188,255 | 2/1980 | Gottardo | 156/577 |
| 4,264,396 | 4/1981 | Stewart | 156/384 |
| 4,407,692 | 10/1983 | Torbeck | 156/384 |

FOREIGN PATENT DOCUMENTS

| | | | |
|---|---|---|---|
| 52-2400 | 1/1977 | Japan | 101/288 |

*Primary Examiner*—Edward Kimlin
*Assistant Examiner*—Louis Falasco
*Attorney, Agent, or Firm*—Harrington A. Lackey

[57] ABSTRACT

A pneumatic labelling apparatus including a portable base frame having a unitary handle member, in which the base frame includes a magazine for supporting a roll of separable label carrying web material, a web entraining device guiding the web from the magazine past a dispensing station, where each label is separated from the backing web, and then about a web feeding device. The web feeding device is sequentially actuable by a ratchet and pawl mechanism in which the pawl is reciprocably mounted upon a movable frame member within the base frame and operatively connected to the piston rod of a fluid-actuated cylinder within the handle member. The piston rod is actuated by a trigger and a control valve in a fluid circuit connected to the fluid-actuated cylinder.

8 Claims, 5 Drawing Figures

PNEUMATIC LABELLING APPARATUS

BACKGROUND OF THE INVENTION

This invention relates to a manually operated labelling apparatus, and more particularly to a manually operated, pneumatically controlled, portable labelling apparatus.

Manually operated label dispensing machines or devices are well-known in the art, such as that disclosed in the prior U.S. Pat. No. 4,188,255 of Guido Gottardo for a "PRICE LABELLING APPARATUS" issued Feb. 12, 1980.

The label dispensing apparatus disclosed in the above Gottardo U.S. Pat. No. 4,188,255, as well as other types of prior labelling apparatus, are designed to feed through the apparatus an elongated web or backing strip upon which the labels are serially and separably mounted. The apparatus is provided with a web entraining device which is adapted to peel back the continuous flexible backing strip or web to separate the individual labels from the backing web and dispense or apply the adhesive label upon the surface of an article.

In the above prior label dispensing apparatus, the web is fed in increments by a feeding mechanism, such as a ratchet and pawl feed mechanism, which is sequentially actuated by squeezing a pair of scissors-like handles. The operator generally squeezes a movable handle toward a fixed handle causing the printing head to descend and print indicia, such as the price, upon a forward label, and simultaneously retract the actuating mechanism in preparation for the next feeding movement. When the handles are manually released, a spring urges the handles apart causing the feeding mechanism to index the web one full label length, and simultaneously to retract the printing head.

Labelling apparatus such as those described above, are used in the apparel manufacturing industry for applying serially numbered labels to garment pieces in cloth layers, for shade marking. Such label applying apparatus also have other uses, such as in applying adhesive labels to commodities in super markets and merchandise stores of all types, and for inventory control. Because of the volume of articles that have to be labelled in such plants and stores, the operator is almost continuously squeezing and relaxing the handles, which creates substantial fatigue, muscle cramps and pain in the arms, hands and joints of the operator. In some garment factories, some operators have applied as many as 15,000–20,000 labels upon as many different garment pieces in a single day.

In the manipulation of the pivotally mounted handles in such portable label applying apparatus, sufficient effort must be expended in each squeezing operation to overcome the strength of the coil spring designed to restore the handles to their original position, as well as the various frictional forces created between the moving parts mounted within the base frame of the labelling apparatus.

SUMMARY OF THE INVENTION

It is therefore an object of this invention to provide a labelling apparatus, and particularly a manually operated, portable labelling apparatus which is capable of being sequentially actuated by only one finger of the operator, with considerably less effort, force, and stress upon the operator, and with more rapidity than previous manually operated labelling apparatus.

The manually operable labelling apparatus made in accordance with this invention, includes a fluid-actuated motor, such as a pneumatic cylinder or a hydraulic cylinder, mounted in the handle member of the apparatus and operably connected to a movable web feeding mechanism within the base frame of the apparatus. The fluid-actuated cylinder is preferably double-acting and connected in a fluid circuit including a control valve operated by a trigger. The control valve is adapted to reverse the direction of the fluid to each respective end of the fluid-actuated cylinder, thereby positively driving the piston rod for periodically reciprocably moving the feed drive actuator mechanism.

By manipulating the trigger to the fluid control valve, the operator exerts only enough effort to cause the valve member to shift between corresponding open and closed positions within a valve cylinder to change the direction of fluid flow through the control valve to the fluid-actuated cylinder.

All of the inertia and frictional forces resulting from the moving parts within the apparatus are absorved by the fluid forces within the fluid cylinder, and not by the operator's hands, muscles, or joints.

If the fluid cylinder incorporated within a pneumatic labelling apparatus made in accordance with this invention is used, only an external source of compressed air, such as a conventional air compressor, is required for the successful operation of the labelling apparatus. Most industrial plants are already equipped with sources of compressed air, and particularly apparel manufacturing plants.

Because of the forces available in the compressed air supply, and because of the sensitivity of the valve control mechanism, a minimal effort is required to operate the trigger in this labelling apparatus. Accordingly, the feeding and application of labels from this labelling apparatus may be effected more rapidly and expeditiously than manually operated labelling apparatus heretofore known and in conventional use.

DESCRIPTION OF THE PREFERRED EMBODIMENT

Figure 1:
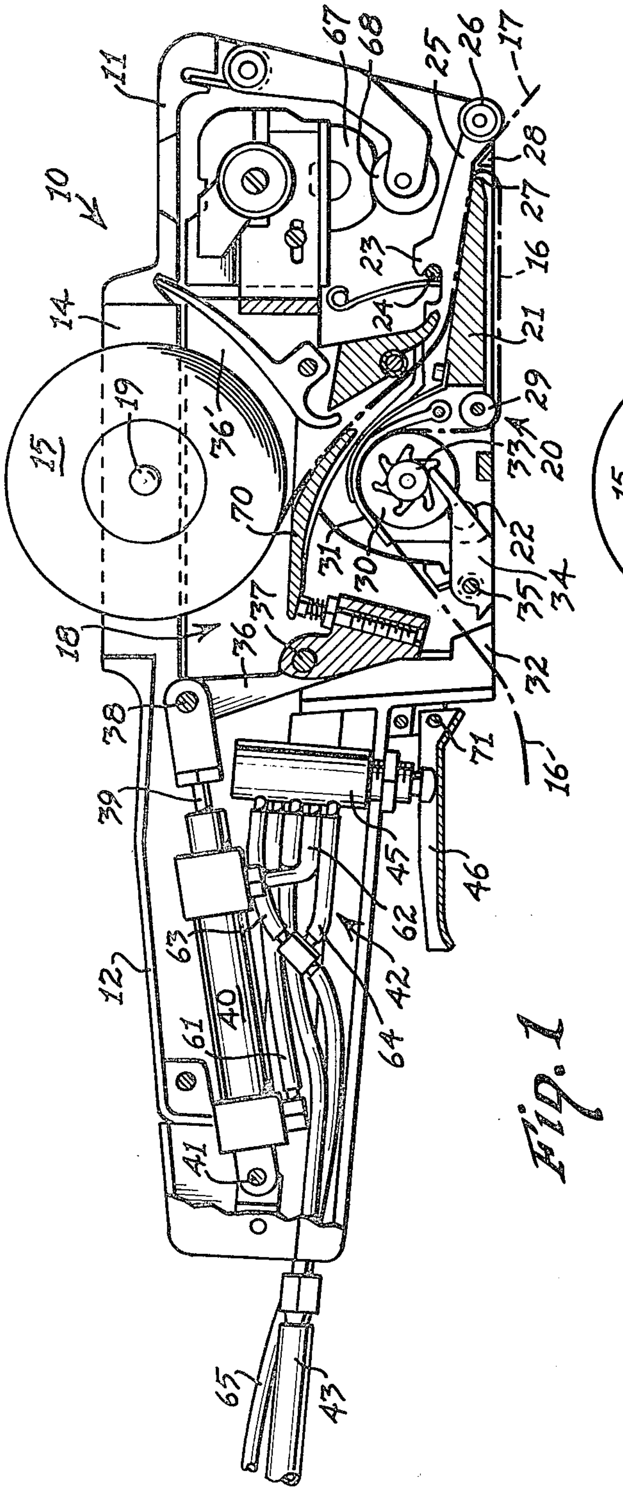
FIG. 1 is a side elevation of an apparatus made in accordance with this invention, with parts borken away and shown in section, and with the trigger disclosed in an inoperative position and the fluid cylinder in a retracted position.
Figure 2:
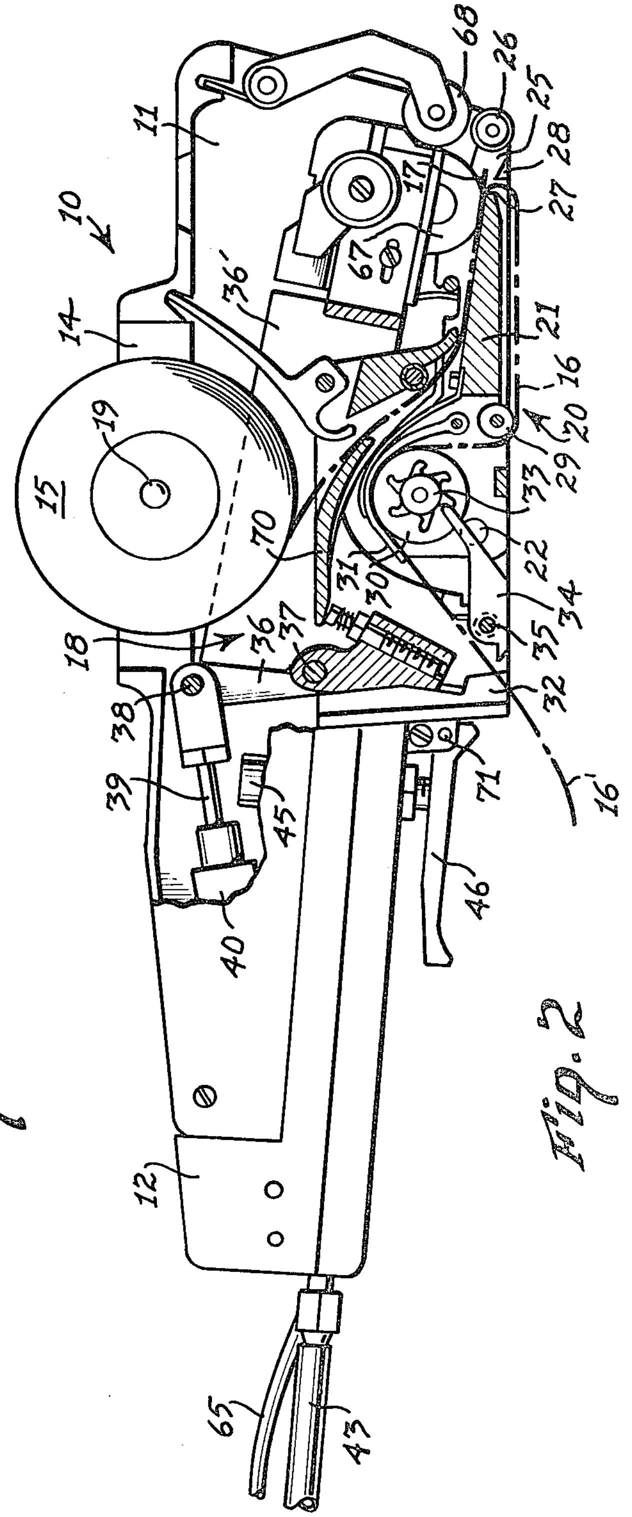
FIG. 2 is a view similar to FIG. 1, with the trigger in an operative position and the fluid cylinder in a protracted position.

Referring now to the drawings in more detail, FIGS. 1 and 2 disclose the labelling apparatus 10, made in accordance with this invention, including an elongated main or base frame 11 having an elongated handle member 12 projecting from the rear portion of the base frame 11.

An opening 14 is provided in the upper portion of the frame 11 for receiving a roll 15 of an elongated web or strip of backing material 16 carrying a plurality of serially arranged, discrete, adhesive labels 17, within a magazine 18. The roll 15 is supported upon the shaft 19 which is pivotally mounted in the side walls of the frame 11 for free rotatable movement.

Mounted in the lower portion of the frame 11 is a web entraining device 20 including a tiltable support arm 21, hinged at its rear end about the journal pins 22 to the side walls of the frame 11. The support arm 21 is held in its upper operative position by the catches 23 engaging transverse rod 24 between the side walls of the frame 11, so that the entraining device 20 is normally a fixed part of the frame 11.

The front end portion of the support arm 21 is provided with a dispensing slot 25. The front portion of the slot 25 is bounded by a transverse freely rotatable pressure roller 26, while the rear edge of the slot 25 is defined by a transverse sharp nose 27 of the support arm 21. Projecting laterally into the opposite sides of the slot 25 are a pair of sharp bosses 28.

As best disclosed in FIG. 1, a web or backing strip 16 sharply reverses direction from the movement of the label 17, over the nose 27, since the web 16 is carried downwardly and rearwardly between the nose 27 and the bosses 28. On the other hand, the independent labels 17 continue to move forwardly over the bosses 28 and beneath the pressure roller 26, the slot 25 forms a dispensing station in which the labels 17 are separated from the backing web 16 by the sharp reverse movement of the web 16, to peel the web 16 from each label 17.

By manually forcing the pressure roller 26 against an object to which it is desired to apply a label 17, the adhesive-backed labels 17 will automatically adhere to the desired object.

The web or backing strip 16 is then carried over a rear idler roller 29 and thence upward over a feed roller 30. The web 16 is held against the surface of the feed roller 30 by a spring-biased hold-down cover 31. The web 16 is then discharged through a discharge opening 32 in the bottom portion of the frame 11, where the spent web 16 may be torn off and discarded, in a known manner.

Fixed to both sides of the feed roller or feed wheel 30 are a pair of ratchets 33 having generally radially projecting teeth. The teeth of each ratchet 33 are adapted to be operatively engaged for sequential movement by a corresponding pawl 34, which is pivotally carried by a pin 35 upon a movable frame, specifically a lever member 36 journaled by the transverse pivot shaft 37 in the side walls of the base frame 11.

Pivotally connected to the upper rear end portion of the movable frame member 36 by pin 38 is a piston rod 39 reciprocably carried in the pneumatically-actuated cylinder 40. The rear end of the cylinder 40 is mounted within the handle member 12 by pivot pin 41.

Fluid circuitry 42 connects the fluid cylinder 40 to a fluid supply conduit 43.

The fluid circuitry 42 includes a control valve 45 adapted to be actuated manually by a pivotal trigger member 46 for selectively directing fluid, such as compressed air, from the fluid supply conduit 43 to either end portion of the cylinder 40, in order to selectively force the piston 48 (shown in phantom in FIGS. 4 and 5) and the piston rod 39 in a forward (protracted) or rearward (retracted) direction.

Figures 3, 4, 5:
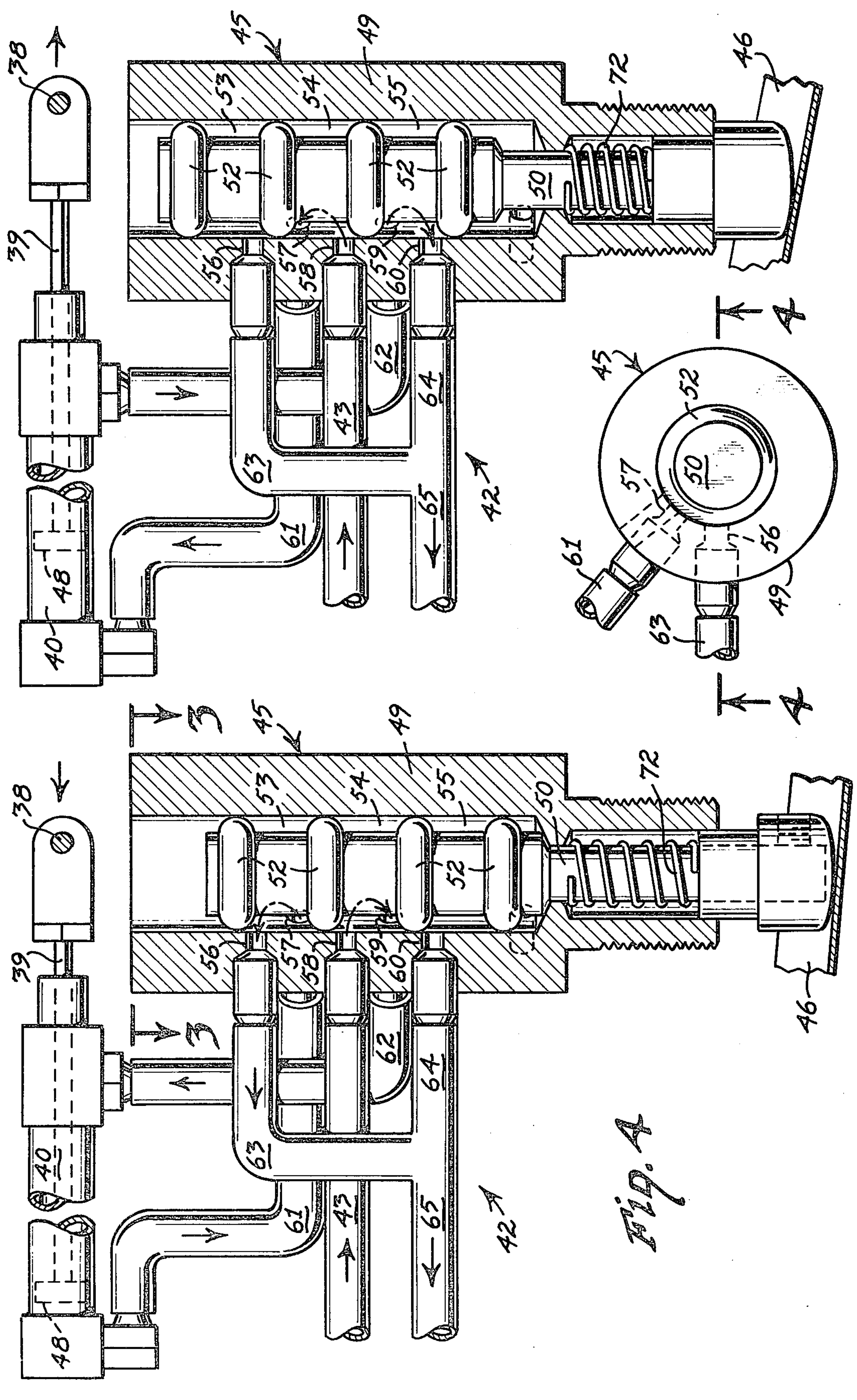
FIG. 3 is an enlarged fragmentary top plan view, taken along the line 3—3 of FIG. 4, of the control valve member.
FIG. 4 is a sectional view taken along the line 4—4 of FIG. 3 of the control valve member connected to the fluid circuitry and cylinder shown schematically with the trigger in inoperative position and the fluid cylinder retracted.
FIG. 5 is a view similar to FIG. 4, with the trigger shown in operative position and the fluid cylinder protracted.

As illustrated in FIGS. 3–5, the control valve 45 is specifically disclosed in the form of a vertically disposed valve cylinder 49 including a vertically slidable valve stem 50. The valve stem 50 supports a plurality of vertically spaced annular ridges or 0-rings 52, which define three vertically spaced annular valve chambers 53, 54 and 55.

Formed along the left wall, as viewed in FIGS. 4 and 5 of the drawings, of the valve cylinder 49, are vertically spaced and staggered ports 56, 57, 58, 59 and 60.

The supply port 58 is in fluid communication with the fluid supply conduit 43.

The rear cylinder port 57 is in fluid communication with the rear end portion of the fluid cylinder 40 through rear fluid conduit 61.

The front cylinder port 59 is in fluid communication with the front end portion of the cylinder 40 through front fluid conduit 62.

Exhaust ports 56 and 60 are respectively in fluid communication with the exhaust branch lines 63 and 64, which merge to form fluid exhaust conduit 65.

The spacing of the ports 56–60 and the ridges 52 are such that when the trigger 46 is in its lower inoperative position disclosed in FIG. 4, the upper chamber 53 is in fluid communication with the rear cylinder conduit 61 and the exhaust branch line 63, thereby permitting exhaustion of the rear portion of the fluid cylinder 40. Simultaneously, the intermediate valve chamber 54 is in fluid communication between the supply conduit 43 and the front cylinder conduit 62 to direct compressed fluid into the front end portion of the cylinder 40, causing the piston 48 and piston rod 39 to move rearwardly, or to the retracted position, thereby pivotally moving the movable frame member 36 to its rearward position disclosed in FIG. 1.

When the trigger 46 is in its lower inoperative position, as disclosed in FIG. 4, the lowermost valve chamber 55 is non-functional since it is in fluid communication only with the exhaust branch line 64.

When the trigger member 46 is manually raised to its operative position disclosed in FIG. 5, the upper valve chamber 53 becomes non-functional. However, the intermediate valve chamber 34 is in fluid communication between the supply conduit 43 and the rear cylinder conduit 61. Simultaneously, the lower valve chamber 55 is in fluid communication between the front cylinder conduit 62 and the exhaust branch line 64. Accordingly, in the operative position disclosed in FIG. 5, compressed air will be directed into the rear end portion of the cylinder 40 to force forward, or to protract, the piston 48 and piston rod 39, to cause the movable frame member 36 to rotate in a clockwise direction to its position disclosed in FIG. 2.

Where it is desired to imprint the labels 17 in the apparatus 10, a printing head 67 may be rotatably mounted upon the extension 36' of the movable frame member 36, if desired. The printing head 67 may be provided with a swinging ink roller 68 pivotally mounted upon the front end portion of the frame 11. The printing head 67 and the inking roller 68 may be of the same construction as that disclosed in the above-discussed U.S. Pat. No. 4,188,255.

Furthermore, the apparatus 10 may be provided with a pivotal brake device 70, simiilar to that described in the above Gottardo U.S. Pat. No. 4,188,255, if desired.

In the operation of the apparatus 10, the magazine 18 is first loaded with a roll 15 of the labels 17 carried on a backing strip or web 16. The web 16 is then threaded as shown in FIGS. 1 and 2, down across the support arm 21 of the web entraining device 20. The web itself is then threaded between the nose 27 and the abutments 28, then rearwardly over the idler guide roller 29, and then up and over the feed roller 30 beneath the spring-biased cover member 31. The free end of the web 16 extends through the discharge opening 32. The labels 17 are threaded between the abutments 28 and the pressure roller 26.

In the inoperative position of the labelling apparatus 10 as disclosed in FIGS. 1 and 4, the trigger member 46 is in its lowermost inoperative position to cause the piston rod 39 and the movable frame member 36 to remain in their retracted position.

When it is desired to apply a label 17 upon an article, the operator grasps the handle member 12 in one hand with one finger about the trigger member 46, applies the pressure roller 26 down against the surface of the article upon which the label 17 is to be affixed. The trigger 46 is then squeezed, actuating the control valve 45 to move the stem 50 upward to the position disclosed in FIG. 5. In this operative position, fluid, such as compressed air, flows from the supply conduit 43 into the rear end portion of the cylinder 40, protracting the piston 48 and piston rod 39 to cause the movable frame member 36 to rotate in a clockwise direction about its transverse pivot shaft 37, to the position disclosed in FIG. 2. In this operation, the pawl 34 is moved to the rear in preparation for the next feeding operation. Also in this operative position disclosed in FIG. 2, the printing head 67 (if incorporated) is depressed to stamp the next label 17 to be dispensed, while the previously printed label projecting under the pressure roller 26, as disclosed in FIG. 1, is secured by its lower adhesive surface to the desired article to be labelled, after the label 17 readily separates from the backing web 16, in a known member.

After the label 17 is applied to the article, and the next label 17 is printed, as disclosed in FIG. 2, the operator relaxes his or her grip upon the trigger 46 to permit the trigger 46 to return to its lower inoperative position disclosed in FIGS. 1 and 4, simultaneously moving the pawl 34 forward to drive the teeth of the ratchets 33, causing the feed roller 30 to move the web 16 through an incremental distance equal to the exact length of one label 17. Thus, the next printed label 17 will be thrust downward between the abutments 28 and the pressure roller 26, and simultaneously separated from the backing strip 16.

It will thus be observed that in executing one printing and dispensing cycle of the apparatus 10, only the trigger member 46 has to be moved upwardly about its pivot pin 71 a slight distance against only the resistance created between the enlarged ridges 52 and the valve cylinder wall 49 and the strength of a very light spring 72 in the bottom of the control valve 45, as disclosed in FIGS. 4 and 5. In some instances, the spring 72 may not be required if the weight of the valve stem 50 is sufficient to return the valve stem 50 to its lowermost position disclosed in FIG. 4, by gravity. It is preferable to utilize the spring 72 to overcome any tendency of the valve stem 50 to stick within the cylinder 49.

It will thus be seen that a labelling apparatus 10 has been designed which may be more expeditiously and rapidly operated manually with a minimum of effort and fatigue, and with an attendent reduction in pain and soreness of muscles and joints and disability to the operator. Such benefits result in improved production with a minimum of absenteeism, particularly where the labelling apparatus are in substantial continuous use such as in apparel manufacturing plants.

What is claimed is:

1. A labelling apparatus comprising:

(a) an elongated base frame having front and rear end portions, (b) magazine means on said base frame for receiving an elongated web carrying serially a plurality of peelable adhesive labels, (c) a web entraining device on said base frame for guiding the web from said magazine means to a dispensing station where the labels are sequentially removed from the web, and then to a web feeding station, (d) a web feeding device at said web feeding station, operable to move a web through said web entraining device, (e) a movable frame member, (f) means mounting said movable frame member on said base frame for movement relative to said base frame, (g) a feed actuator element carried on said movable frame member in operable engagement with said web feeding device for actuating said web feeding device upon movement of said feed actuator element, (h) a handle member fixed to the rear portion of said base frame, (i) a fluid-actuated cylinder mounted on said handle member and having a reciprocable piston rod, (j) means connecting said piston rod to said movable frame member for movement of said movable frame member with said piston rod, (k) fluid circuit means mounted on said handle member and in fluid communication with said cylinder and a fluid supply, (l) a control valve member in said fluid circuit means for controlling the flow of fluid to said cylinder, and, (m) a trigger on said handle member and operatively connected to said control valve member for actuating said piston rod to reciprocably move said movable frame member to cause incremental feeding of a web in said web entraining device.

2. The invention according to claim 1 in which said web feeding device comprises a ratchet-driven web feeding device and said feed actuator element comprises a pawl operatively engaging said ratchet-driven web feeding device.

3. The invention according to claim 2 in which said movable frame member comprises a lever member having first and second end portions, said means mounting said movable frame member comprising pivot means pivotally mounting said lever member upon said base frame, said means connecting said piston rod to said movable frame member comprising means pivotally connecting said piston rod to said first end portion of said lever member, said pawl being pivotally mounted on said second end portion of said lever member.

4. The invention according to claim 1 in which said fluid-actuated cylinder has first and second end portions, and said fluid circuit means comprises a first conduit connecting the first end portion of said cylinder to said control valve member, a second fluid conduit connecting said second end portion of said cylinder to said control valve member, a fluid supply conduit connected to said control valve member, said control valve member having exhaust means, whereby selective actuation of said trigger causes said control valve member to reverse the flow of fluid from said fluid supply conduit to said first and second end portions of said cylinder for corresponding reciprocal movement of said piston rod.

5. The invention according to claim 4 in which said control valve member comprises a valve chamber in fluid communication with said fluid conduits and a reciprocable valve stem within said valve chamber engagable with said trigger, whereby movement of said trigger to a first position creates fluid communication between said supply conduit and the first end portion of said fluid-actuated cylinder and fluid communication between the second end portion of said fluid cylinder and said exhaust means, and movement of said trigger actuated to a second position creates fluid communication between said supply conduit and the second end portion of said fluid-actuated cylinder, and fluid communication between the first end portion of said cylinder and said exhaust means.

6. The invention according to claim 4 in which said exhaust means comprises a fluid exhaust conduit in fluid communication with said valve cylinder and carried in said handle member.

7. The invention according to claim 6 in which said exhaust means comprises a pair of spaced exhaust ports and exhaust branch lines connecting said respective exhaust ports to said fluid exhaust conduit.

8. The invention according to claim 1 in which said movable frame member projects forwardly along said base frame, and further comprises a printing head mounted on the forward end portion of said movable frame member for selective engagement and disengagement with a label on a web in said web entraining device for printing indicia upon said label.

* * * * *